United States Patent [19]
Ota

[11] Patent Number: 5,331,635
[45] Date of Patent: Jul. 19, 1994

[54] NETWORK SYSTEM HAVING FUNCTION OF UPDATING ROUTING INFORMATION

[75] Inventor: Hiromi Ota, Kawasaki, Japan

[73] Assignee: Fuji Xerox Co., Ltd., Japan

[21] Appl. No.: 17,142

[22] Filed: Feb. 12, 1993

[51] Int. Cl.⁵ .............................................. H04J 3/02
[52] U.S. Cl. .............................. 370/85.130; 370/94.1
[58] Field of Search ................ 370/94.1, 85.13, 85.14, 370/94.3, 60.60.1; 340/825.51, 827, 825.5, 825.05, 826; 371/11.1, 11.2

[56] References Cited

U.S. PATENT DOCUMENTS

| | | | |
|---|---|---|---|
| 4,597,078 | 6/1986 | Kempt | 370/94.1 |
| 5,018,133 | 5/1991 | Tsukukoshi et al. | 370/85.6 |
| 5,081,621 | 1/1992 | Sugimoto | 370/85.13 |
| 5,179,553 | 1/1993 | Tanuka | 370/85.14 |
| 5,204,858 | 4/1993 | Kinashi et al. | 370/94.1 |

FOREIGN PATENT DOCUMENTS 2143746  3/1986  Japan.
2143759  7/1992  Japan.

OTHER PUBLICATIONS

*Internetworking with TCP/IP*, by D. E. Comer and D. L. Stevens; Prentice Hall, Inc., 1991, vol. 2, pp. 81–101.

Primary Examiner—Douglas W. Olms
Assistant Examiner—Ajit Patel
Attorney, Agent, or Firm—Welsh & Katz, Ltd.

[57] ABSTRACT

A network system which comprises a plurality of networks, a single or a plurality of terminal devices connected to each of the plurality of networks, and a plurality of manager units for relaying data transferred between the terminal devices and for transmitting to the networks broadcasting communication data having a destination address for broadcasting and also having its own address to be used as a transmission originator, which is arranged to reduce the useless holding of routing information on decision of a communication path in the system so as to minimize the necessary memory capacity of each terminal device, monitors an elapse time after acquisition of the routing information and an elapse time after the last utilization thereof and, when any one of these elapse times exceeds their predetermined threshold times, deletes the associated routing information and its related information.

8 Claims, 6 Drawing Sheets

| net | NUMBER OF NETWORK TO WHICH DATA IS TRANSMITTED |
|---|---|
| age | DATA LIFE (INITIAL VALUE 0) |
| delay | DISTANCE TO NETWORK TO WHICH DATA IS TRANSMITTED |
| lastAccess | TIME AT WHICH DATA WAS LASTLY UTILIZED |
| route | ADDRESS OF MANAGER UNIT WHICH PROVIDED DATA |

FIG.6 (a)

| net | D |
|---|---|
| age | 0 |
| delay | 2 |
| lastAccess | 12:00:00 |
| route | R12 |

FIG.6 (b)

| net | D |
|---|---|
| age | 0 |
| delay | 2 |
| lastAccess | 12:00:01 |
| route | R12 |

FIG.6 (c)

CURRENT TIME 12:08:35

| net | D | B |
|---|---|---|
| age | 30 | 120 |
| delay | 2 | 2 |
| lastAccess | 12:08:30 | 12:07:00 |
| route | R12 | R11 |

FIG.6 (d)

| net | D | B |
|---|---|---|
| age | 60 | 0 |
| delay | 2 | 2 |
| lastAccess | 12:09:55 | 12:10:00 |
| route | R12 | R11 |

FIG.6 (e)

CURRENT TIME 12:10:35

| net | D |
|---|---|
| age | 180 |
| delay | 2 |
| lastAccess | 12:10:30 |
| route | R12 |

FIG.6 (f)

| net | D |
|---|---|
| age | 0 |
| delay | 3 |
| lastAccess | 12:10:36 |
| route | R11 |

NETWORK SYSTEM HAVING FUNCTION OF UPDATING ROUTING INFORMATION

BACKGROUND OF THE INVENTION

1. Field of the Invention

The present invention relates to network systems for establishing data communication between a plurality of networks such as internetworks and more particularly, to an implementation of a network system which has a function of suitably updating routing information on the decision of communication path and can efficiently manage a minimum amount of routing information.

2. Description of the Related Art

FIG. 7 shows a logical configuration of this sort of conventional network system referred to the above. In the drawing, terminal devices E11, E12, E21 . . . are connected to networks A, B, and C. A manager unit R11 is connected to the networks A and B to transfer data between these networks the shortest route. On the other hand, a manager unit R12 is connected to the networks A and C to transfer data between these networks by the shortest route.

For example, when it is desired to transmit data from the terminal device E11 to the terminal device E21, the terminal device E11 asks the manager unit R11 to relay and transmit the data to the terminal device E21 through the manager unit R11 the shortest route between the networks A and B. in this way, for the purpose of transmitting data by the shortest route, each of the terminal devices previously stores therein the shortest routes from the network connected to its own to the other networks. When data transmission is required, the associated terminal device selects one of the shortest routes according to its destination terminal device, and asks one of the manager units which provides the selected shortest route to relay and transmit the data. The manager units find the shortest routes between the respective networks and broadcast the data as routing information from the manager units to the respective terminal devices. Each terminal device stores the routing information in a routing table located therein. Since the logical configuration of a network system varies from time to time, the routing information is updated as necessary and periodically broadcast to the terminal devices. Accordingly, each terminal device periodically receives the latest routing information and stores it in the table for management.

If the terminal device cannot receive such broadcast routing information for some reason for a period of time, then the information already stored in the routing table of the terminal device is not updated, i.e., becomes old and loses a value as information. In other words, the terminal device continues to possess the old information.

In order to update the routing information held in each terminal device, there has been suggested such a routing information updating system in which each terminal device per se issues an update request on the routing information (refer to Japanese Patent Application Laid-Open Publication No. 2-143759).

However, this system of the above Publication, which is arranged to hold all routing information, is defective in that, when the network system is enlarged in scale or made complicated, this undesirably leads to a very large amount of routing information. For this reason, the prior art system has had a problem that it becomes difficult for each terminal device to secure a memory area enough to store the routing information and management cost becomes high.

Also, in Japanese Patent Application Laid-Open Publication No. 2-143746, there has been suggested a routing information managing system in which each terminal device extracts a necessary route from routing information transmitted from a manger and stores only the extracted route therein for management. This processing system is advantageous in that an information memory area can be reduced since the terminal device is required to store therein only the necessary route extracted from the routing information, but is disadvantageous in that the terminal device still holds the old useless information because the terminal device cannot judge the validation of the information already held therein.

SUMMARY OF THE INVENTION

In view of the above circumstances, it is an object of the present invention to provide a network system which has a function of updating routing information to allow each terminal device to avoid holding of useless information and to hold a necessary minimum amount of routing information.

In accordance with an aspect of the present invention, there is provided a network system which basically comprises a plurality of terminal devices connected to a plurality of networks and a plurality of manager units for relaying data transferred between the terminal devices and for transmitting to the networks broadcasting communication data having a destination address for broadcasting and also having its own address to be used as a transmission originator, and in which each of the terminal devices comprises extraction means, address memory means, request means, selection means, routing information memory means, first and second deletion means.

In the invention, the extraction means receives the broadcasting communication data transmitted from the respective manager units and extracts addresses of the respective manager units from the broadcasting communication data. The address memory means stores therein the addresses of the respective manager units. The request means requests the respective manager units to provide routing information on the basis of the addresses of the manager units stored in the address memory means. The selection means selects one of the manager units which is used to relay the data and one of the routing information on the basis of the routing information obtained from the manager units as a result of the request from the request means. The routing information memory means stores therein the selected routing information, information on a time at which the selected routing information was acquired and information on a time at which the selected routing information was utilized, in such a manner that these information are stored in association with each other. Further, the first deletion means refers to the information on the time at which the selected routing information was utilized among the information stored in the routing information memory means and deletes information relating to the routing information being not utilized for a predetermined period of time. The second deletion means refers to the information on the time at which the selected routing information was acquired among the information stored in the routing information memory means and deletes information relating to the routing information which has been stored for more than a predetermined period of time after the acquisition.

In operation of the system of the present invention, the addresses of the manager units extracted by the extraction means are stored in the address memory means so that, when it is desired to transmit data, the addresses stored in the address memory means are referred to for the request means to issue a routing information request to the manager units. The selection means selects, on the basis of the routing information received from the manager units as a result of the request, one of the manager units for relay of the data and one of the associated routing information. The then selected routing information, the information on the time at which the routing information was acquired, and the information on the time at which the routing information was utilized are stored in the routing information memory means. The first deletion means manages the information on the time at which the routing information was utilized which is stored in the routing information memory means. The first deletion means, when the stored routing information was not utilized for a predetermined period of time, deletes the information relating to the corresponding routing information. Similarly, the second deletion means manages the information on the time at which the routing information was acquired which is stored in the routing information memory means, The second deletion means, when a predetermined time elapses after acquisition of the routing information, deletes the information relating to the corresponding routing information. As a result, useless routing information which was not frequently utilized and the old routing information which was frequently utilized but being stored for more than a certain time are automatically deleted, whereby the necessary memory capacity of each terminal device can be minimized.

BRIEF DESCRIPTION OF THE DRAWINGS

FIGS. 6(a) to 6(f) show states of the routing table respectively; and

DESCRIPTION OF THE PREFERRED EMBODIMENTS

A network system in accordance with an embodiment of the present invention will be detailed with reference to the attached drawings.

Figures 2, 3:
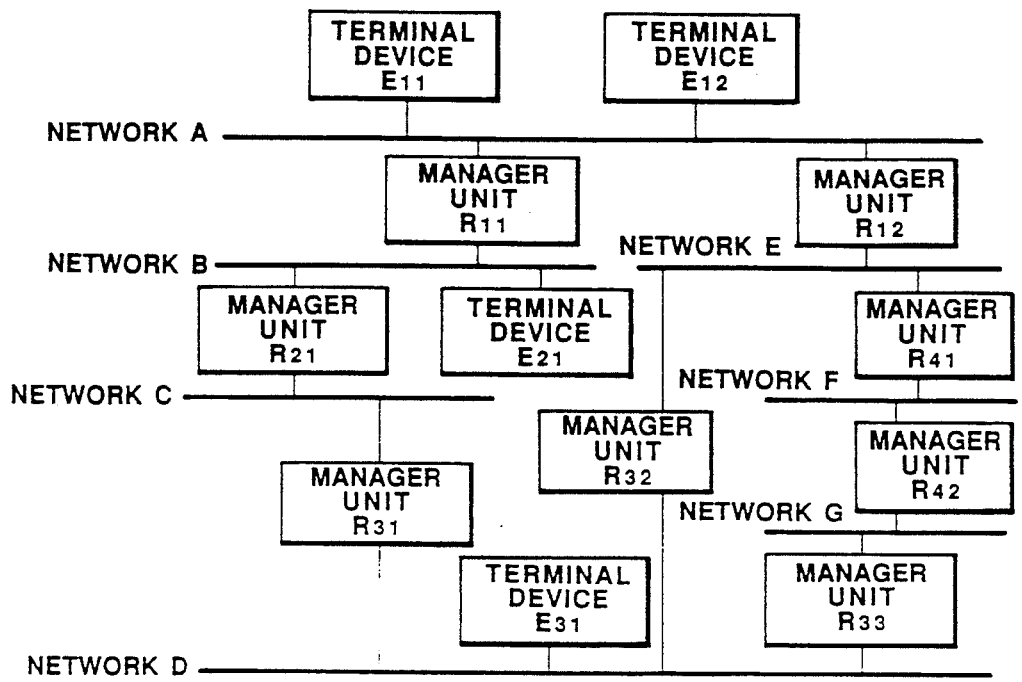
FIG. 2 shows a logical configuration of the network system of the invention.
FIG. 3 is a routing table used in the terminal device of the embodiment.

Referring first to FIG. 2, there is shown a logical configuration of the network system according to the present invention. On networks A to G, as shown in the drawing, there are provided a plurality of manager units Rxx (R11, R12, R21, . . . ) for management of routing information and a plurality of terminal devices (E11, E12, E21, . . . ) which communicate with each other on the basis of the routing information provided from the manager units to the networks A to G. The plurality of networks A to G are connected by the manager units Rxx.

Figure 1:
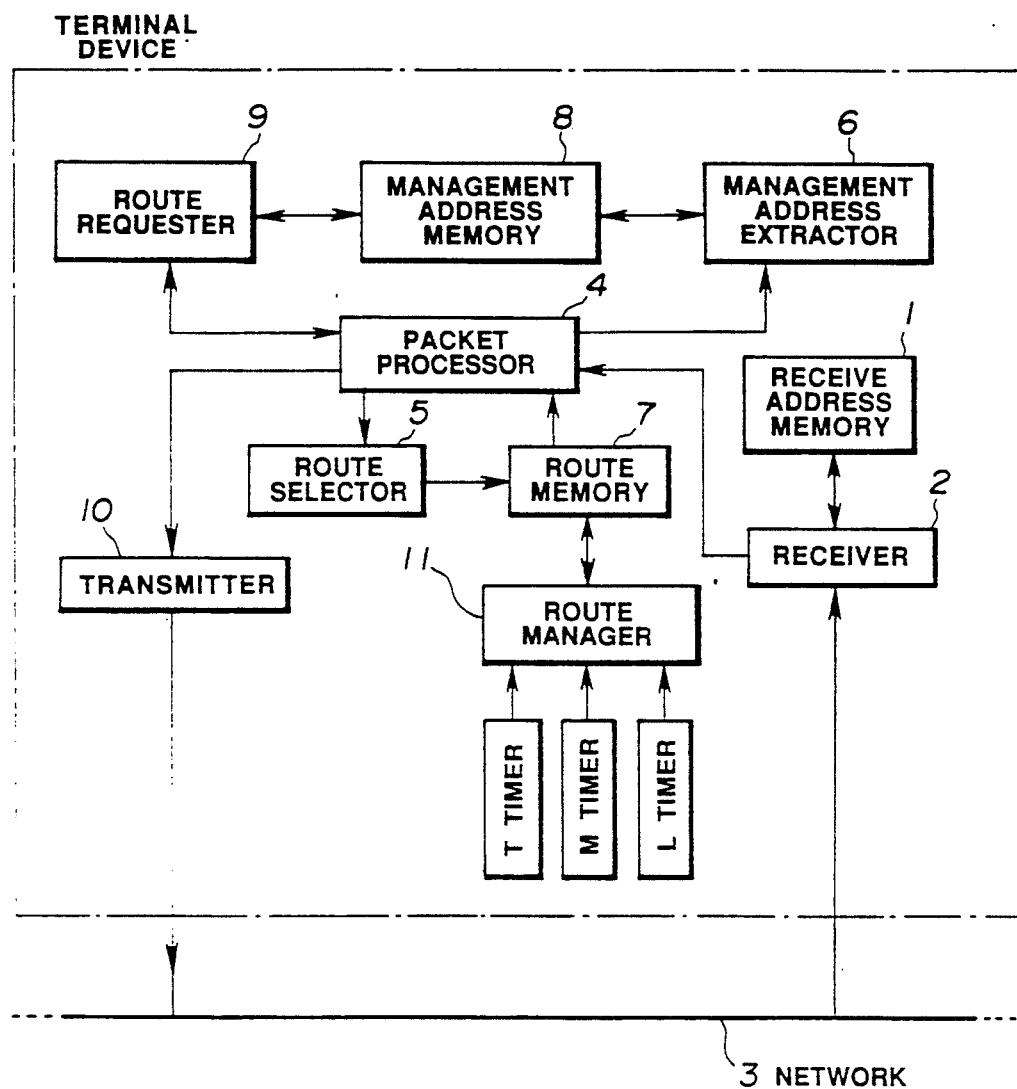
FIG. 1 is a block diagram of a terminal device applied to a network system in accordance with an embodiment of the present invention.

Shown in FIG. 1 is a block diagram of a basic structure of the terminal device applied to the above network system. The terminal device of the present embodiment can be applied to any one of the terminal devices E11, E12, E21, . . . in the network system of FIG. 2.

A receive address memory 1 previously stores therein an address of its own terminal device and an address indicative of broadcasting communication (that is, a group address).

A receiver 2 is connected to a network 3 to receive a packet on the network 3. The receiver 2, when receiving the packet, collates a destination address contained in the received packet with the respective addresses previously stored in the receive address memory 1. When the destination address coincides with any one of the addresses stored in the receive address memory 1, this means that the received packet is to be directed to its own terminal device and thus the receiver 2 passes the received packet to a packet processor 4. When the destination address fails to coincide with any of the addresses stored in the receive address memory 1, this means that the received packet is not to be directed to its own terminal device and thus the receiver 2 discards the received packet.

The packet processor 4 processes a received packet and when the received packet whose destination address indicates its own terminal device includes the routing information, the packet processor 4 passes the packet to a route selector 5. When a received packet whose destination address indicates the broadcasting communication includes the routing information, the packet processor 4 passes the packet to a management address extractor 6. In either case, when the received packet contains no routing information, the packet processor 4 performs predetermined operation over the received packet.

The route selector 5, when receiving from the packet processor 4 a packet which contains the destination address indicative of its own terminal device and also contains the routing information, selects one route on the basis of the routing information and stores it in a route memory 7. The route memory 7 stores therein the routing information received from the route selector 5, information on a time at which the routing information was acquired, and information on a time at which the routing information was utilized, in such a manner that the information are stored in association with each other. A routing table usable in the terminal device of the present embodiment is shown in FIG. 3.

FIG. 3 shows items and their contents which are set in the routing table. In the illustrated example, the information on the time at which the routing information was acquired is expressed in terms of 'age' as a relative value with respect to the acquired time, while the information on the time at which the routing information was utilized is expressed in terms of 'Last Access' corresponding to a time at which the information was lastly utilized. The route memory 7 holds in the table the routing information for the number corresponding to the number of the networks on which the communicated terminal devices exist.

A route manager unit 11 performs managing operation over the information stored in the routing table of the route memory 7. More in detail, when its own terminal device generates a request to transmit data there-from to the network 3, the route manager unit 11 retrieves one of the addresses of the respective manager units stored in the route memory 7, requests the respective manager units to provide the routing information on the basis of the addresses, and executes the following operations (a), (b)and (c).

Rewrites the routing table on the basis of the received routing information.

(b) Refers to the information on the time at which the routing information in the route memory 7 was utilized and deletes the information relating to the routing information being not utilized for a predetermined period of time.

(c) Refers to the information on the time at which the routing information in the route memory 7 was acquired and deletes the information relating to the routing information being stored for more than a predetermined period of time.

The management address extractor 6, when receiving from the packet processor 4 a packet containing a destination address indicative of broadcasting communication and also containing the routing information, extracts from the received packet a transmission originator or sender address, i.e., the address of the manager unit, and stores the address of the manager unit into a management address memory 8.

When the packet processor 4 issues to a route requester 9 a command to retrieve the addresses of the manager units, the route requester 9 retrieves the addresses stored in the management address memory 8 and sends the retrieved address back to the packet processor 4.

A transmitter 10 receives from the packet processor 4 the packet to be transmitted and transmits the packet to the network 3.

Figure 4:
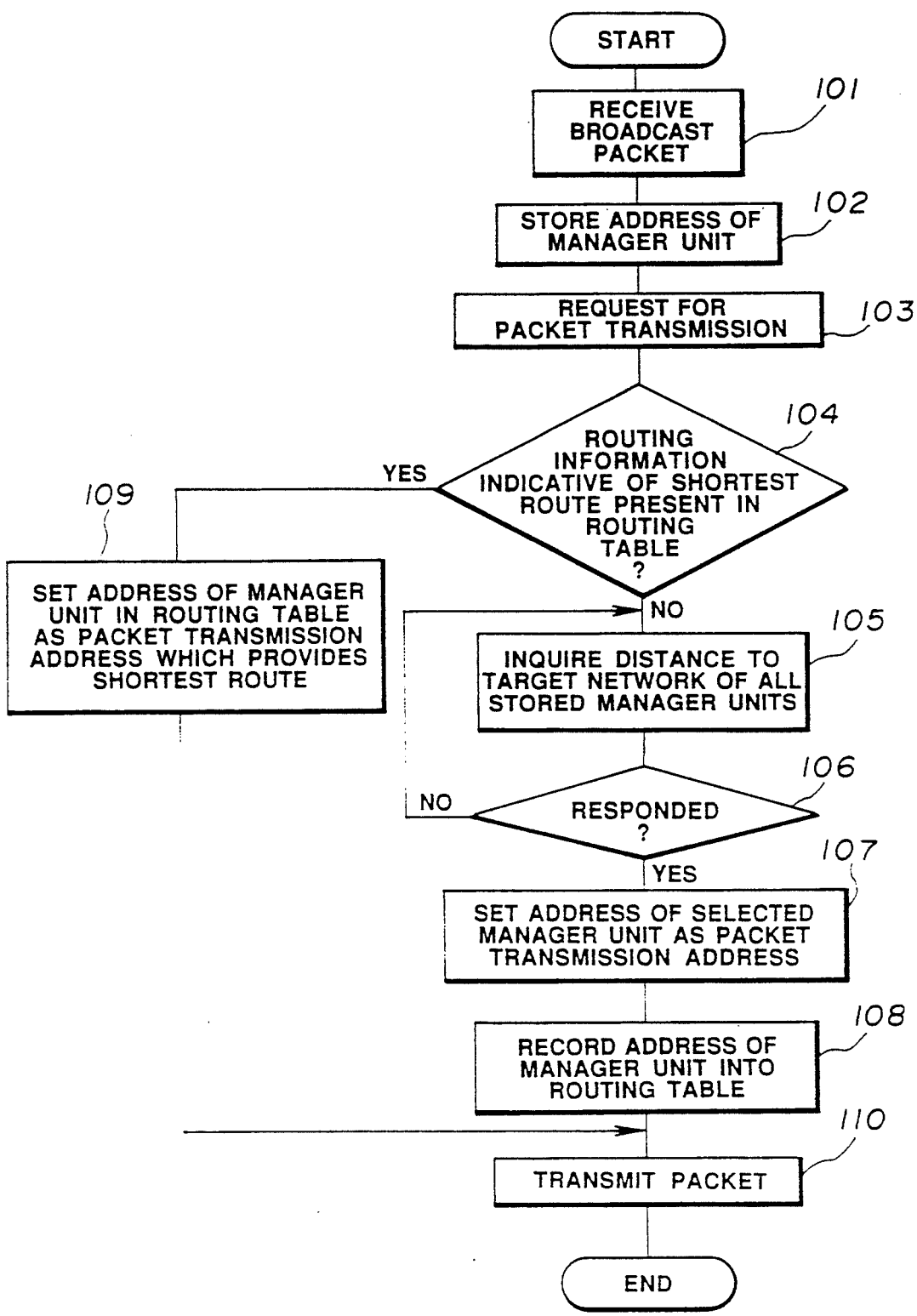
FIG. 4 is a flowchart for explaining the procedure of how to receive and transmit a broadcast packet.

With the terminal device having such a structure as mentioned above, when the terminal device corresponds, for example, to the terminal device E11 in FIG. 2, the terminal device performs such operations as shown by a flowchart in FIG. 4, each time the manager unit R11 or R12 periodically sends a packet including the routing information to the network A. The periodically sent packet is such a packet that is broadcast to all the terminal devices connected to the network A and that contains a destination address indicative of the broadcasting communication. Such a packet will be referred to as a broadcast packet, hereinafter.

In FIG. 4, when the manager unit R11 sends a broadcast packet to the network A, the receiver 2 of the terminal device E11 receives the broadcast packet having the routing information (step 101) and judges whether or not the destination address of the broadcast packet coincides with any one of the addresses stored in the receive address memory 1. In this case, since the address indicative of the broadcasting communication is contained as the destination address in the broadcast packet, the broadcast packet is passed to the packet processor 4.

The packet processor 4, when receiving the broadcast packet, confirms that the received packet contains the broadcasting communication address and also contains the routing information, and thereafter passes the broadcast packet to the management address extractor 6.

The management address extractor 6, when receiving the broadcast packet, extracts from the packet the address of the manager unit R11 as its transmission address and stores the manager address in the management address memory 8 (step 102).

Even when the manager unit R12 sends a broadcast packet to the network A, the similar operations to the above are carried out so that the address of the manager unit R12 is stored in the management address memory 8.

Now, explanation will be made as to the case where the terminal device E11 sends a packet to the terminal device E31 on the network D for the first time, as an example.

When the terminal device E11 generates a packet transmission request to transmit a packet to the terminal device E31 located on the network D (step 103), the route manager unit 11 searches in the routing table of the route memory 7 an entry (the address of the manager unit which is to relay the packet) of the route of the terminal device E11 to the network D to judge the presence or absence of the routing information indicative of the shortest route (step 104). In this example, since the route manager unit 11 fails to find any entry in the routing table, the route requester 9 reads out the addresses of the manager units R11 and R12 from the management address memory 8 and passes them to the packet processor 4.

The packet processor 4 sends a packet to the manager units R11 and R12 through the transmitter 10 to inquire the manager units about a distance to the network D (step 105) and waits for responses from the manager units (step 106).

Next, the route selector 5 selects, on the basis of the response information from the manager units R11 and R12, one (R12 in the illustrated example) of the manager units R11 and R12 which offers the shortest route with the shortest distance to the target network D.

The packet processor 4 sets the address of the selected manager unit R12 as the transmission address of the packet to be transmitted (step 107). Thereafter, the route manager unit 11 records the address of the manager unit R12 and the routing information into the routing table of the route memory 7 (step 108), and causes the transmitter 10 to transmit the packet to the manager unit R12 (step 110).

Meanwhile, in the step 104, if there is the routing information indicative of the shortest route in the routing table, the address of the manager unit offering the shortest route is set as the transmission address of the packet to be transmitted ( step 109 ). And the transmitter 10 transmits the packet to the manager unit R12 (step 110).

In this way, not only the terminal device is designed to await periodical reception of the broadcast packet but also to immediately acquire the routing information indicative of the shortest route on the basis of the requests to the manager units at the time of transmitting a packet, which results in that the packet can be quickly transmitted.

Figure 5:
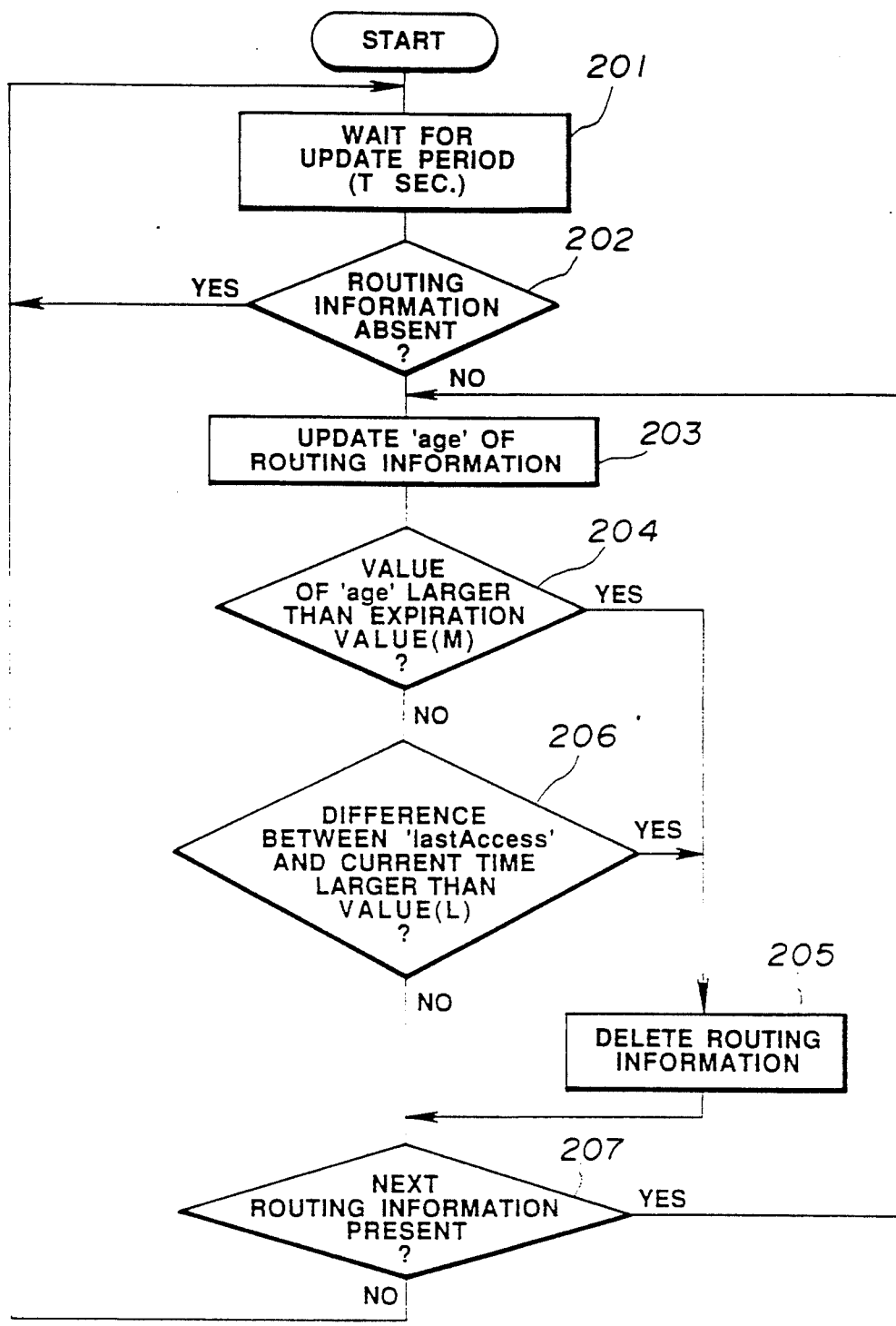
FIG. 5 is a flowchart for explaining the procedure of how to update routing information.
Figure 7:
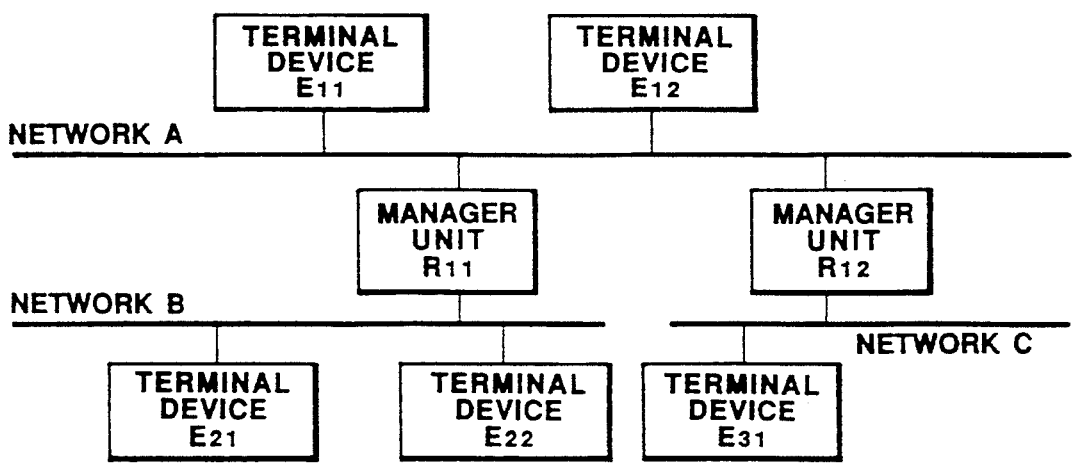
FIG. 7 shows a logical configuration of a prior art network system.

Explanation will then be made as to the processing procedure when the route manager unit 11 updates the routing information stored in the routing table, by referring to a flowchart of FIG. 5.

First, timers set by the route manager unit 11 as well as the functions thereof will be explained in the following.

Routing Information Updating Period (T) Timer

The accuracy of the routing information is maintained by checking the routing table at a predetermined period (T).

Routing Information Expiration Value (M) Timer

Even though the routing information is frequently used, since the routing information having a value larger than the expiration value (M) of the routing information is the information being stored for more than a certain time and also the status of the network may vary with time to time, a new inquiry has to be made to the manager unit.

Routing Information Maximum Use Interval (L) Timer

Since it is unnecessary to store such routing information as not frequently utilized, the maximum use interval is previously set to determine the utilization frequency of the routing information.

Meanwhile, the route manager unit 11 registers the routing information provided from the manager unit R12 as the entry of the route to the network D, the current time as the value of the 'Last Access', and 'age=0' as a relative value to a time at which the routing information was acquired. The then state of the routing table is shown in FIG. 6(a). In the illustrated state, '12:00:00' is recorded as the Last Access value.

The route manager unit 11 also sets the update timer (T) when a routing entry is created. In FIG. 5, the route manager unit 11 waits for the update period (T seconds) (step 201) and judges whether or not there is the routing information in the routing table (step 202). In the presence of the routing information, the route manager unit 11 updates the information 'age' (step 203). When T=30 seconds for example, the value of the 'age' is added by 30 seconds (which means that 30 seconds have passed after acquisition of the routing information).

Next, the route manager unit 11 compares the value of the 'age' with the expiration value (M) (step 204) and when the value of the 'age' is larger than the expiration value (M), deletes the associated routing information (step 205).

When the value of the 'age' is not larger than the expiration value (M), on the other hand, the route manager unit 11 compares the current time with the value of the 'Last Access' (step 206). When a difference between the value of the 'Last Access' and the current time is larger than a value of (L), the route manager unit 11 goes to the step 205 and deletes the associated routing information.

When determining "No" in both of the steps 204 and 206, the route manager unit 11 judges the presence or absence of the next routing information (step 207). The presence of the remaining routing information causes the route manager unit 11 to return to the step 203, while the absence of the remaining routing information causes the route manager unit 11 to return to the step 201.

When it is desired for the terminal device E11 to transmit a new packet to the terminal device E31 several minutes after transmission of a packet to the terminal device E31, the presence of the entry of the route to the network D in the route memory 7 causes the transmission to be carried out with use of the entry information and also the current time to be recorded as the value of the 'Last Access'. The then state of the routing table is shown in FIG. 6(b).

Assume now that the update period (T)=30 seconds, the expiration value (M)=180 seconds, the maximum interval (L)=90 seconds, packet transmission is continuously carried out from the terminal device E11 to the terminal device E31 on the network D, and packet transmission is carried out only once from the terminal device E11 to the terminal device E21 of the network B. The then state of the routing table is shown in FIG. 6(c). In this case, updating of the routing information is carried out according to the flowchart of FIG. 5 already explained above. More specifically, the value '120' of the routing information of the network B is less than the value M (180 seconds) but the value '95' (=12:08:35-12:07:00=00:01:35) of the 'Last Access' is larger than the value L (90 seconds) (refer to the step 206 of FIG. 5). Thus, the routing information of the network B is deleted as the information not frequently used. This means that the unnecessary data not utilized was deleted.

When it is desired for the terminal device E11 to transmit a packet again to the terminal device E21 several seconds later, the latest information can be acquired according to the flowchart of FIG. 4 already explained above. The state of the routing table when the latest information was acquired is shown in FIG. 6(d).

Assuming as an example that the update period (T)=30 seconds, the expiration value (M)=180 seconds, the maximum interval (L)=90 seconds, the manager unit R32 of FIG. 2 stops its operation, and the terminal device E11 continuously transmits a packet to the terminal device E31; then the state of the routing table is shown in FIG. 6(e). In this example, since the value '180' of the 'age' of the routing information of the network D is equal to or larger than the value M (180 seconds) according to the flowchart of FIG. 5 already explained above (refer to the step 204 in FIG. 5), the routing information is deleted from the routing table as the old information being stored for more than a certain time.

Further, when it is desired for the terminal device E11 to transmit a packet to the terminal device E31 several seconds later, the latest information can be acquired through the manager unit R11 according to the flowchart of FIG. 4, because of the absence of the entry of the route to the network D. The then state of the routing table when the latest information was acquired is shown in FIG. 6(f). In this case, it is possible to obtain the routing information of a network system of which status has been changed due to the operation stoppage of the manager unit R32.

Although the value of the 'age' in the routing table has been set to start from zero (0) in the foregoing embodiment, the present invention is not limited to the specific example but the value of the 'age' of the routing table may start not from zero but from the expiration value (M) and may be subtracted for every update period.

What is claimed is:

1. A network system having a function of updating routing information comprising:
   a plurality of networks;
   a single or a plurality of terminal devices connected to each of said plurality of networks; and
   a plurality of manager units for relaying data transferred between said terminal devices and for transmitting to said networks broadcasting communication data having a destination address for broadcasting and also having its own address to be used as a transmission originator, each of said terminal devices comprising:

extraction means for receiving the broadcasting communication data transmitted from said manager units and for extracting addresses of said manager units from the broadcasting communication data;

address memory means for storing therein the addresses of said manager units;

request means for requesting, on the basis of the addresses of the manager units stored in said address memory means, said manager units to provide routing information, said routing information having related information;

selection means for selecting, on the basis of the routing information obtained from the manager units as a result of the request from said request means, one of the manager units which is used to relay said data transferred between said terminal devices and a first routing information;

routing information memory means for storing therein said first routing information selected by the selection means, a second information on a time at which said first routing information was acquired and a third information on a time at which the first routing information was utilized, said first, second, and third information being stored in association with each other; and first deletion means for referring to said third information among said information stored in said routing information memory means and for deleting both said routing information and said related information which have not been utilized for a predetermined period of time.

2. A network system having a function of updating routing information comprising:

a plurality of networks;

a single or a plurality of terminal devices connected to each of said plurality of networks; and a plurality of manager units for relaying data transferred between said terminal devices and for transmitting to said networks broadcasting communication data having a destination address for broadcasting and having its own address to be used as a transmission originator, each of said terminal devices comprising:

extraction means for receiving the broadcasting communication data transmitted from said manager units and for extracting addresses of said manager units from the broadcasting communication data;

address memory means for storing therein the addresses of said manager units;

request means for requesting, on the basis of the addresses of the manager units stored in said address memory means, said manager units to provide routing information, said routing information having related information;

selection means for selecting, on the basis of the routing information obtained from the manager units as a result of the request from said request means, one of the manager units which is used to relay said data transferred between said terminal devices and a first routing information;

routing information memory means for storing therein said first routing information, a second information on a time at which said first routing information was acquired and a third information on a time at which said selected first routing information was utilized, said first, second, and third routing information being stored in association with each other; and deletion means for referring to said second information among said information stored in said routing information memory means and for deleting both the routing information and said related information which have been stored for more than a predetermined period of time after acquisition.

3. A network system having a function of updating routing information comprising:

a plurality of networks;

a single or a plurality of terminal devices connected to each of said plurality of networks; and a plurality of manager units for relaying data transferred between said terminal devices and for transmitting to said networks broadcasting communication data having a destination address for broadcasting and also having its own address to be used as a transmission originator, each of said terminal devices comprising:

extraction means for receiving the broadcasting communication data transmitted from said manager units and for extracting addresses of said manager units from the broadcasting communication data;

address memory means for storing therein the addresses of said manager units;

request means for requesting, on the basis of the addresses of the manager units stored in said address memory means, said manager units to provide routing information, said routing information having related information;

selection means for selecting, on the basis of said routing information obtained from the manager units, one of the manager units which is used to relay said data transferred between said terminal devices and a first routing information;

routing information memory means for storing therein said first routing information selected by the selection means, a second information on a time at which said selected first routing information was acquired and a third routing information on a time at which the first routing information was utilized; said first, second, and third routing information being stored in association with each other to form associated routing information; and a first deletion means for referring to said third routing information among said first, second, and third routing information stored in said routing information memory means and for deleting said routing information and said related information not being utilized for a predetermined time, including a first timer having a threshold time set for judging the degree of utilization frequency of the routing information stored in said routing information memory means and wherein when a difference between the time at which the routing information was utilized and a current time exceeds said threshold time set in said first timer, said first deletion means deleting said associated routing information and said related information.

4. A network system having a function of updating routing information comprising:

a plurality of networks;

a single or a plurality of terminal devices connected to each of said plurality of networks; and a plurality of manager units for relaying data transferred between said terminal devices and for transmitting to said networks broadcasting communication data having a destination address for broadcasting and having its own address to be used as a transmission originator, each of said terminal devices comprising:

extraction means for receiving the broadcasting communication data transmitted from said manager units and for extracting addresses of said manager units from the broadcasting communication data;

address memory means for storing therein the addresses of said manager units;

request means for requesting, on the basis of the addresses of the manager units stored in said address memory means, said manager units to provide routing information, said routing information having related information;

selection means for selecting, on the basis of the routing information obtained from the manager units as a result of the request from said request means, one of the manager units which is used to relay said data transferred between said terminal devices and a first routing information;

routing information memory means for storing therein said first routing information selected by the selection means, a second routing information on a time at which said first routing information was acquired and a third routing information on a time at which the first routing information was utilized, said first, second, and third routing information being stored in association with each other;

first deletion means for referring to said third routing information among said first, second, and third routing information stored in said routing information memory means and for deleting the routing information not being utilized for a predetermined period of time; and a second deletion means for referring to said second information among the information stored in said routing information memory means and for deleting the routing information and said related information which has been stored for more than a predetermined period of time after acquisition of said information.

5. A network system having a function of updating routing information as set forth in claim 4, wherein said second deletion means includes a second timer in which a threshold time is set for judging freshness of the routing information stored in said routing information memory means and wherein, when a difference between the time at which the routing information was acquired and a current time exceeds said threshold time set in said second timer, said second deletion means deletes the associated routing information and the related information.

6. A network system having a function of updating routing information as set forth in claim 5, wherein said second deletion means further includes a third timer in which a time corresponding to a desired update period of the routing information stored in said routing information memory means is set and also includes means for accumulating said time as a relative time to the time at which the routing information was acquired each time the time set in said third timer elapses and wherein, said second deletion means compares the accumulated time as the difference between the time at which the routing information was acquired and the current time with the time set in said second timer.

7. A network system having the function of updating routing information comprising:

a plurality of networks;

a single or a plurality of terminal devices connected to each of said plurality of networks; and a plurality of manager units for relaying data transferred between said terminal devices and for transmitting to said networks broadcasting communication data having a destination address for broadcasting and also having its own address to be used as a transmission originator, each of said terminal devices comprising:

extraction means for receiving the broadcasting communication data transmitted from said manager units and for extracting addresses of said manager units from the broadcasting communication data;

address memory means for storing therein the addresses of said manager units;

request means for requesting, on the basis of the addresses of the manager units stored in said address memory means, said manager units to provide routing information, said routing information having related information;

selection means for selecting, on the basis of the routing information obtained from the manager units as a result of the request from said request means, one of the manager units which is used to relay said data transferred between said terminal devices and a first routing information;

routing information memory means for storing therein said first routing information, a second routing information on a time at which said first routing information was acquired and a third routing information on a time at which the first routing information was utilized, said first, second, and third routing information being stored in association with each other; and deletion means for referring to said third routing information among said first, second, and third routing information stored in said routing information memory means and for deleting the routing information not being utilized for a predetermined time, said deletion means including an expiration value timer in which a threshold time is set for judging freshness of the routing information stored in said routing information memory means and wherein, when a difference between the time at which the routing information was acquired and a current time exceeds said threshold time set in said expiration value timer, said deletion means deletes the associated first, second, and third routing information and said related information.

8. A network system having a function of updating routing information as set forth in claim 7, wherein said deletion means further includes an update period timer in which a time corresponding to a desired update period of the routing information stored in said routing information memory means is set and also includes means for accumulating said time as a relative time to said time at which the routing information was acquired each time the time set in said update period timer elapses, and wherein said deletion means compares the accumulated time as the difference between said time at which the routing information was acquired and the current time with the time set in said expiration value timer.

* * * * *